3,051,671
EPOXY RESIN-ISANO OIL COMPOSITIONS
Lowell O. Cummings, San Anselmo, Calif., assignor to Pacific Vegetable Oil Corporation, San Francisco, Calif., a corporation of California
No Drawing. Filed Dec. 7, 1959, Ser. No. 857,545
18 Claims. (Cl. 260—18)

This invention relates to reaction products of epoxy resins and isano oil. More particularly, this invention relates to non-catalyzed processes of making epoxy resin-isano oil coating compositions which, when baked and cured, are very chemical-resistant, hard, and flexible. The invention also relates to compositions containing these epoxy resin-isano oil reaction products.

The widespread use of hardenable liquid coatings to protect objects from chemicals and mechanical damage has created an ever-present need for improved compositions to supply a greater degree of protection than was heretofore available. For instance, in the canning industry, practically every so-called tin can is now coated with a liquid composition which, when it hardens, protects the contents from reaction with the metal of the can. Other metallic structures, ranging from washing machines to dime-store toys, are conventionally coated with some type of protective material to at least retard the effects of compositions and forces with which they come in contact.

Much use is made of epoxy resin compositions for these purposes, and in particularly reaction products of epoxy resins and vegetable oil fatty acids and/or their lower alkyl esters, since they can be baked or cured to form tough, durable coatings. However, the reaction between the epoxy resin and these fatty acids and esters requires a catalysts, which materially increases the cost of the final product. Also, since epoxy resins will not react with vegetable oils, but only with their fatty acids and lower alkyl esters, an additional expense is encountered in breaking down the oils to form these acids and esters. Although these epoxy-vegetable oil acid reaction products have good coating qualities, they are not totally indestructible, so that there is room for improvement on them.

Generally speaking the invention involves reacting the epoxy resin with isano oil, a dark vegetable oil derived from the nuts of the boleko tree, which belongs to the Olacaceae family and is known as Onguekoa Gore Engler or Onguekoa Klaineana. The trees which bear these nuts grow abundantly in the French and Belgian Congo regions of Africa.

Isano oil is a mixture of glycerides of highly unsaturated fatty acids, mainly isanic and isanolic acids. Both of these acids are unusual in that they contain conjugated triple-bond linkages, and isanolic acid also contains an hydroxyl group on the eighth carbon atom. This unique chemical construction may account for the highly superior properities of the novel coating materials made by this invention from isano oil and epoxy resins. For a full and interesting description of this oil, see the article by J. A. Kneeland et al., "Isano Oil, a Conjugated Triple Bond Glyceride," on pages 361–363 of The Journal of the American Oil Chemists' Society, volume XXXV, No. 7, July 1958.

The epoxy resins used in this invention may be made by reacting mono-epoxides, such as epichlorohydrin, or di-epoxides, such as diglycide ether, with bi- or poly-valent mono- or poly-nuclear phenols, and derivatives thereof, usually in an alkaline solution. In addition to having at least one terminal epoxide or glycidyl group, some of these epoxy resins have one or more intermediate alcoholic hydroxyl groups, and some also contain one or more intermediate epoxide groups. These are well-known compositions marketed by many companies under a variety of trade names.

One series of epoxy resins suitable for use in this invention are the Epons, available from Shell Chemical Corporation. The Epons contain two terminal epoxide groups and intermediate hydroxyl groups, and vary from mobile liquids, to viscous liquids, to solids, depending upon their molecular weight. Of the many Epons useful for forming the inventive compositions, Epon 1001 and Epon 1004 give excellent results. The structural formula and other data of the Epon resins may be found on page 77 of the "Supplement I to the 1953 Edition of Handbook of Material Trade Names," by Zimmerman and Lavine, published by Industrial Research Service Inc., Dover, New Hampshire, in 1956.

Another type of epoxy resin which is quite satisfactory for purposes of this invention is manufactured and sold by the Borden Chemical Company under the name of Epiphen. The Epiphens are polyfunctional in the epoxide group, having two terminal epoxide groups and intermediate epoxide groups varying in number according to the molecular weight of the resin. These Epiphen resins range from low viscosity liquids to semi-solids, and are quite different from the majority of epoxy resins in that modified novolac resins are used as the base for the epoxide molecule rather than bisphenol-A. A representative structural formula of these Epiphens is as follows:

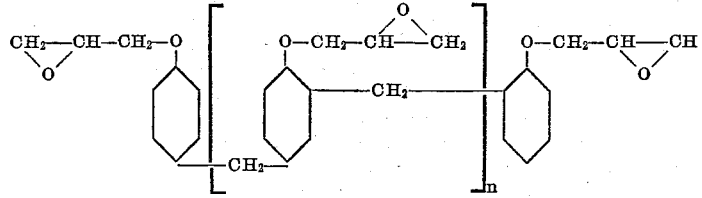

where $n$ designates the extent of polymerization.

Another class of operable epoxy resins, produced and marketed by Union Carbide Chemicals Co., is represented by Epoxide 201 (3,4-epoxy-6-methylcyclohexylmethyl-3,4-epoxy-6-methylcyclohexanecarboxylate), Epoxide 207 (dicyclopentadiene dioxide), dipentene dioxide (or Limonene dioxide), and vinylcyclohexene dioxide (or 1-epoxyethyl-3,4-epoxycyclohexane).

Other Epon-type epoxy resins, for instance those with an esterification equivalent weight of 145 and an epoxide equivalent (i.e., number of grams of resin per gram mole of epoxide) of 450 to 525, such as Epotuf 6301 (Reichhold Chemicals, Inc.), those with an esterification equivalent weight of 175 and an epoxide equivalent of 875 to 1025, such as Epotuf 6304 (Reichhold Chemicals, Inc.), Araldite 6089 (Ciba Company, Inc.) and Epi-Rez 530 (Jones-Dabney Company), and those with an esterification equivalent weight of 170–200 and an epoxide equivalent of 1550–2000, such as Epotuf 6307 (Reichhold Chemicals, Inc.), form very suitable products according to this invention. In fact, any resin which contains at least one epoxide group may be used in this invention, so that the foregoing serves merely to illustrate some preferred species rather than disclosing all operable varieties.

One possible theory as to the nature of the reaction between the epoxy resin and the isano oil is that one or a combination of the following reactions takes place: (1) the hydroxyl groups in the isano oil open the epoxide groups in the epoxy resin, and ether linkages between the oil and resin are formed; (2) the carboxyl groups from the small amount of free fatty acids in the isano oil form ester linkages with the epoxide and/or the hydroxyl groups in the epoxy resin, and (3) an alcoholysis reaction cleaves the glycerides at the ester groups, followed by subsequent esterification of the epoxy resin at its hydroxyl and/or epoxide groups by the fatty acid carboxyl groups. Whether these reactions indeed take place has not been fully proved; therefore, there is no intention to be restricted to or by this theory.

The proportions of epoxy resin to isano oil which give the desired results vary within a wide range. Very satisfactory results have been achieved with combinations within the range of 3:1 to 1:4, resin to oil, by weight. By varying the ratio of the two reactants, the final product may be tailored to the individual need.

Two methods of reacting the epoxy resin and isano oil may be used. In both, no catalyst need be used. This reaction in the absence of a catalyst is unique, since reactions between epoxides and all other vegetable oils heretofore reacted with epoxides have required a catalyst. One of these methods of this invention is the fusion process, wherein the reactants, in a fluid state, are combined in the absence of any additional material, and then heated to carry out the reaction. The other method, a solvent reflux process, involves combining the epoxy resin and isano oil in the presence of a solvent medium and boiling the mixture under azeotropic reflux conditions. Both procedures produce equally satisfactory products and each has its own advantages; so the choice of the method may depend on which is preferable under the particular circumstances.

Where a fairly high cooking temperature is employed, i.e., approaching 400° F., a closer hold on the temperature can be achieved by the reflux procedure. At this high temperature, this procedure is preferred, since isano oil has a tendency to react exothermically, in a violent manner, at or above 400° F. However the reactions may be carried out at any temperature within the range of about 250° F. to about 450° F., with about 320° F. being preferred. Furthermore, the heating may be continued for upward of 8 hours, with 4 to 6 hours preferred. Various combinations of heat and time may be used, so long as the final product is satisfactory. Atmospheric pressure, or thereabouts, prevails in all the reactions.

The following examples are set forth merely to illustrate several embodiments of the invention, but not in any way to limit it. In view of the many epoxy resin-isano oil combinations, no attempt has been made to set forth each one, but merely a representative number thereof.

In describing the viscosity of the product, the conventional Gardner-Holdt scale is used. Also, the colors of the resinous products are by the Gardner 1933 color scale.

To prepare a solution of the product for viscosity, color, and acid value measurements, the product was dissolved in Socal Solvent #2, a xylene-type, low aniline petroleum solvent of the intermediate range, having evaporating qualities similar to xylol, obtained from Standard Oil Company of California.

EXAMPLE 1

Into a three-liter flask equipped with a stainless steel paddle stirrer, a thermometer, an inert gas inlet tube, an azeotropic leg and condenser, 1000 grams of isano oil, 1000 grams of Epon 1004 (an epoxy resin with a soft point between 195° F. and 220° F., an epoxide equivalent between 875 and 1025, and an esterification equivalent weight of about 175) and 160 grams of xylene solvent were charged. A nitrogen atmosphere was established above the liquid reactants and maintained throughout the reaction. The mixture was heated with constant stirring to 370° F. within 30 minutes, and the xylene was refluxed to maintain a temperature of between 370° F. and 395° F. Samples of the reaction product were periodically removed and tested for clarity and length of string by placing a drop thereof on a glass plate and drawing out the tacky substance. A clear pill was obtained at the end of one hour. Heating was continued for five more minutes and then terminated. The resulting product was dissolved in equal parts of Socal Solvent #2. This solution had a viscosity of U, a color of 18, and an acid value less than 0.5.

EXAMPLE 2

Seven hundred grams of isano oil, 700 grams of Epon 1001 (an epoxy resin with a soft point between 150° F. and 170° F., an epoxide equivalent of between 450 and 525, and an esterification equivalent weight of 145) and 100 grams of toluene were charged into an apparatus similar to that used in Example 1. A nitrogen atmosphere was established over the liquid reactants and the temperature was raised to 385° F. The toluene was refluxed to maintain this temperature and at the end of 30 minutes a clear pill was observed. Heating was continued for a total of four hours. The resulting product was dissolved in equal parts of Socal Solvent #2. This solution had a viscosity of G, a color greater than 18, and an acid value less than 0.5.

EXAMPLE 3

In order to determine the feasibility of fusion cooking procedures, the following run was performed. Thirteen hundred grams of isano oil together with thirteen hundred grams of Epon 1004 were charged into a three-liter flask fitted with a paddle stirrer, a thermometer, and an inert-gas inlet tube. The mixture was heated to between 320–330° F. and maintained within that range for 4½ hours. At the end of two hours, a clear pill had developed. The resulting product was then dissolved in equal parts of Socal Solvent #2 to produce a solution having a viscosity of G, a color of 16, and an acid value less than 0.5.

EXAMPLE 4

Twelve hundred grams of Epon 1004 and eight hundred grams of isano oil were subjected to the same reaction conditions as in Example 3. The heating was continued for four hours, and at the end of two-and-one-quarter hours a clear pill was obtained. This product dissolved in equal parts of Socal Solvent #2, and the resulting solution had a viscosity of J, a color of 15, and an acid value of 0.4.

EXAMPLE 5

To determine what effect, if any, a lower reaction temperature would have on the process, thirteen hundred grams of Epon 1004 with thirteen hundred grams of isano oil were heated at a reaction temperature range of 250° F. to 260° F., using a fusion process like Examples 3 and 4. At the end of six hours a clear pill was obtained and the process was discontinued after a total of twelve hours of heating. The product, when dissolved at fifty percent non-volatile in a mixture of equal parts of toluene and Socal Solvent #2, formed a solution which had a viscosity of B–C, a color of 18, and an acid value of less than 0.5.

In the fusion cooking procedure, conditions of heat transfer change when larger volumes of material are used and it must be made certain that enough heat can be dissipated, especially in larger containers, so that a temperature of 400° F. is not exceeded. The use of an inert atmosphere is especially necessary in the fusion process to flush out any water formed and to keep out any oxygen, thereby helping to prevent an exothermic reaction of the isano oil.

EXAMPLE 6

One thousand grams of Epotuf 6304 and one thousand grams of isano oil were subjected to the fusion cooking procedure of Examples 3–5. Twenty grams of calcium octoate were added only to speed up the reaction, not as an essential catalyst therefor, and the mixture heated to a temperature of 390° F. After four hours and fifteen minutes of heating, the mixture cleared and the process was discontinued at the end of seven hours and thirty minutes. The product was dissolved in equal parts of Socal Solvent #2 to produce a solution having a viscosity of L, a color of 15, and an acid value of less than 0.5.

EXAMPLE 7

Five hundred grams of Epi-rez 530 and five hundred grams of isano oil were fusion cooked at a temperature range of 320° F. to 340° F. The product cleared in two hours and heating was discontinued at the end of five more minutes. The properties of this product were the same as those of the product of Example 6.

EXAMPLE 8

To one hundred twenty five grams of Epiphen ER–849 were added one hundred twenty five grams of isano oil. The ingredients were cooked, following the fusion process, at 320° F. In thirty minutes a clear pill had developed. Heating was continued for seven additional hours and then stopped. The resulting resin was viscous and dark.

EXAMPLE 9

A mixture of three hundred grams of Epotuf 6307 (an epoxy resin having an esterification equivalent weight of 170–200 and an epoxide equivalent of 1550–2000), three hundred grams of isano oil, and six grams of calcium octoate (six percent calcium) were fusion cooked in a 3-neck, 1-liter flask fitted with a stirrer, an inert gas inlet tube, and a thermometer. The isano oil was heated to 300° F. and the Epotuf 6307 added portionwise until all the resin had melted into the oil. An inert-gas atmosphere was maintained during the cook. These ingredients were heated to 350° F. in one hour, and then the calcium octoate was added. After thirty minutes of additional heating at 350° F., the mixture became clear as shown by a pill on a cold glass plate. The 350° F. temperature was maintained for an additional thirty minutes. The product was dissolved in equal parts of Socal Solvent #2. This solution had a viscosity of W+½, a color of 17, and an acid value of less than 0.5.

EXAMPLE 10

A mixture of seven hundred fifty grams of Epon 1004 and two hundred fifty grams of isano oil was cooked in a 3-necked, 1-liter flask by the aforementioned fusion process. The temperature rose from 320° F. to 370° F. during the process. A clear pill was obtained at the end of one hour, and heating was then discontinued. The product dissolved readily in an equal amount of Socal Solvent #2. This solution had a viscosity of S, a color of 16, and an acid value of 0.2.

EXAMPLE 11

A mixture of two hundred grams of Epon 1004 and eight hundred grams of isano oil was subjected to a fusion cooking process. During the cooking, the temperature ranged from 350° F. to 360° F. A clear pill was observed at the end of four hours and thirty minutes, and the heating was discontinued. The product was dissolved in Socal Solvent #2 in the ratio of three parts resin-two parts solvent. This solution had a viscosity of F, a color of 18+, and an acid value of 1.6.

EXAMPLE 12

A fusion cook was performed with one hundred grams of Epoxide 201 and one hundred grams of isano oil in a 500-ml. 3-necked flask fitted with a stirrer, a thermometer, and an inert-gas inlet tube. The fusion cook procedures were followed, and the heating was discontinued at the end of three hours. During this time, the temperature rose from 300° F. to 390° F. The product was dissolved in an equal amount of Socal Solvent #2, and this solution had a viscosity of P+½, a color of 18, and an acid value of 0.2.

A film of this product, containing 0.05 percent manganese as manganese octoate, was placed on a phosphorized steel panel. The coated panel was then baked for fifteen minutes at 350° F. An extremely hard but flexible coating resulted.

The above examples serve merely to illustrate a few of the procedures of, and the products obtained therefrom, reacting epoxy resins with isano oil in various proportions and at various conditions. Obviously, many other combinations of time and temperature, as well as of resins and isano oil, may be made. The only limiting feature is the type of end product desired.

The epoxy resin-isano oil compositions heretofore described do not air-dry in any reasonable time, with or without the incorporation of drying agents. However, when they are mixed with compatible air-drying compositions, such as air-drying epoxides, alkyds, varnishes, and vegetable oils, the mixtures will air-dry very well; often better than the normal air-drying resins alone. This is illustrated by the following Table I, which sets forth the results of drying tests performed on various compositions. These tests were made on films 1 mil. thick on glass. The films contained a drier consisting of 0.5 percent lead metal, 0.04 percent manganese metal, and 0.04 percent cobalt metal. A Gardner circulator dry-time recorder was used for the measurements.

Table I

COMPONENTS

| Composition | Percent Resin of 50% Epon 1004 and 50% Isano Oil | Percent Air Drying Resin of 60% Epon 1004 and 40% Dehydrated Castor Oil Fatty Acids | Drying Times | |
|---|---|---|---|---|
| | | | Initial Dry | Through Dry, hours |
| 1 | 100 | 0 | (1) | (1) |
| 2 | 75 | 25 | 2 hours + 15 min. | 22 |
| 3 | 50 | 50 | 1 hour + 30 min. | 11 |
| 4 | 25 | 75 | 30 min. | 7 to 8 |
| 5 | 0 | 100 | 1 to 2 hours | 9 |

[1] Not dry in 48 hours.

These epoxy resin-isano oil compositions are very reactive to heat. When they are applied as coatings and then baked, the coatings are much superior to other epoxy resin-fatty acid esters in resistance to softening when exposed to solvents, such as xylene, mineral spirits, and alcohol. These baked coatings of epoxy resin-isano oil also have superior resistance to cracking from impacts, to bending, and the like, and are generally tougher than other vegetable oil-resin coatings.

Some of these epoxy resin-isano oil compositions are quite dark, but nevertheless are very useful in many coating operations where the color is not objectionable. For instance, these products find extensive utility as coating for the interiors of cans and other containers, as primers for automobiles, for refrigerators, for washing machines, and in other places where chemical and water resistance demands are severe. This dark color is not deleterious to subsequent coatings applied thereover and does not bleed into such later-applied coatings. The other epoxy resin-isano oil compositions are lighter, some even almost colorless, and can be used where the dark color is objectionable.

In view of the lower cost of isano oil as compared to fatty acids, especially dehydrated castor oil fatty acids, which normally are used to make epoxy-vegetable oil resins, the ultimate product resulting from the process of this invention is more desirable from an economic point of view.

Various materials such as fillers, pigments, other resins, etc., may be incorporated in the resin products of this invention, if desired, to produce compositions having a wide range of properties. In this way the product may be tailored to suit a particular need.

To those skilled in the art to which this invention relates, many changes in composition and widely differing embodiments and applications of the invention will suggest themselves without departing from the spirit and scope of the invention. The disclosures and the description herein are purely illustrative and are not intended to be in any sense limiting.

I claim:

1. A process for producing resinous coating compositions, comprising: admixing reactive amounts of isano oil and an epoxy resin at substantially atmospheric pressure and in accordance with a time-temperature combination correct for obtaining a reaction between the said isano oil and the said epoxy resin.

2. A process as defined in claim 1, wherein the admixing is done in the absence of a solvent medium.

3. A process for producing resinous coating compositions, comprising: admixing reactive amounts of isano oil and an epoxy resin at substantially atmospheric pressure and in a solvent medium for a time and at a temperature sufficient to obtain a satisfactory product.

4. A process as defined in claim 3, wherein the temperature of the reaction is between about 250° F. and about 450° F.

5. A process for producing a resinous composition which can be baked into a chemically resistant, flexible and hard coating, comprising: heating a mixture of reactive amounts of (1) isano oil and (2) an epoxy resin produced by etherification, in an alkaline solution, of epichlorohydrin with a member of the group consisting of dihydric and polyhydric mono- and poly-nuclear phenols for up to about twelve hours, at a temperature within the range of about 250° F. to about 450° F., and at substantially atmospheric pressure.

6. A process for producing a coating composition which, when baked, is chemically resistant, flexible, and hard, comprising: reacting, for upwards of eight hours, at a temperature of about 250° F. to about 450° F., at substantially atmospheric pressure, and in the absence of a catalyst, reactive amounts of (1) isano oil and (2) an epoxy resin produced by etherification of epichlorohydrin with a member of the group consisting of dihydric and polyhydric mono- and poly-nuclear phenols.

7. A process for producing coating compositions which, when baked, are chemically resistant, flexible and hard, comprising: heating a mixture of (1) from 1 to 3 parts by weight of an epoxy resinous reaction product of epichlorohydrin and 2,2-bis(4-hydroxyphenyl)propane, and (2) from 1 to 4 parts by weight of isano oil at a temperature within the range of about 250° F. to 450° F., at substantially atmospheric pressure, and for a period of 1 to 8 hours.

8. A process for producing coating compositions which, when baked, are chemically resistant, flexible and hard, comprising: heating a mixture of (1) from 1 to 3 parts by weight of an epoxy resin having the formula

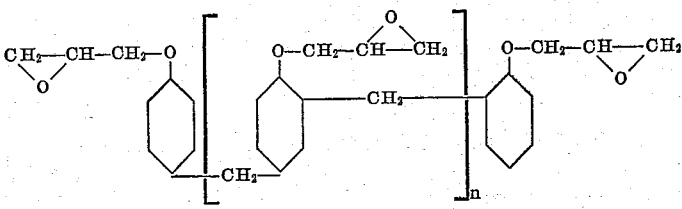

where $n$ is the degree of polymerization, and (2) from 1 to 4 parts by weight of isano oil at a temperature within the range of 250° F. to 450° F., at substantially atmospheric pressure, and for a period of 1 to 8 hours.

9. A process for producing coating compositions which, when baked, are chemically resistant, flexible and hard, comprising: heating a mixture of (1) from 1 to 4 parts by weight of isano oil and (2) from 1 to 3 parts by weight of an epoxy resin selected from the group consisting of 3,4-epoxy-6-methycyclohexylmethyl-3,4-epoxy-6-methylcyclohexanecarboxylate, dicyclopentadiene dioxide, dipentene dioxide, and 1-epoxyethyl-3,4-epoxycyclohexane, at a temperature within the range of about 250° F. to 450° F., at substantially atmospheric pressure, and for a period of 1 to 8 hours.

10. The reaction product of isano oil and an epoxy resin.

11. The reaction product of (1) isano oil and (2) an epoxy resin produced by etherification, in an alkaline solution, of epichlorohydrin with a member of the group consisting of dihydric and polyhydric mono- and poly-nuclear phenols.

12. The reaction product of (1) a resinous reaction product of epichlorohydrin and 2,2-bis(4-hydroxyphenyl)propane, and (2) isano oil.

13. The reaction product of (1) an epoxy resin having the formula

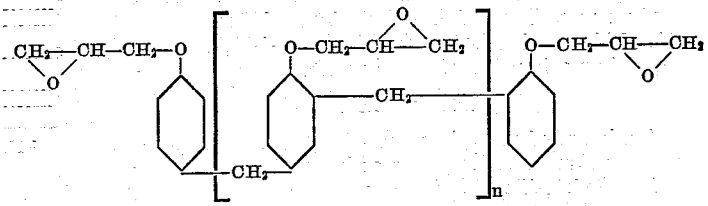

where $n$ is the degree of polymerization and (2) isano oil.

14. The reaction product of (1) isano oil and (2) an epoxy resin selected from the group consisting of 3,4-epoxy-6-methycyclohexylmethyl-3,4-epoxy-6-methylcyclohexanecarboxylate, dicyclopentadiene dioxide, and 1-epoxyethyl-3,4-epoxycyclohexane.

15. A process of rendering isano oil-epoxy resin reaction products air-dryable, comprising: admixing the isano oil-epoxy resin reaction product with a compatible air-drying resinous material.

16. The process of claim 15 wherein the air-drying resinous material is a reaction product of an epoxy resin and dehydrated castor oil fatty acids.

17. An air-drying coating composition comprising a mixture of an isano oil-epoxy resin reaction product and a compatible air-drying resinous material.

18. The composition of claim 17, wherein the air-drying resinous material is a reaction product of an epoxy resin and dehydrated castor oil fatty acids.

References Cited in the file of this patent
UNITED STATES PATENTS

| | | |
|---|---|---|
| 2,596,737 | Tess | May 13, 1952 |
| 2,652,376 | Rinse | Sept. 15, 1953 |
| 2,667,463 | Jakob et al. | Jan. 26, 1954 |
| 2,698,308 | Crecelius | Dec. 28, 1954 |
| 2,754,277 | McNabb | July 10, 1956 |
| 2,921,040 | May | Jan. 12, 1960 |

FOREIGN PATENTS

| | | |
|---|---|---|
| 518,956 | Canada | Nov. 29, 1955 |